United States Patent [19]

Cox et al.

[11] Patent Number: 4,888,863
[45] Date of Patent: Dec. 26, 1989

[54] METHOD AND APPARATUS FOR PRODUCING TURBINE BLADE ROOTS

[75] Inventors: Jimmy A. Cox, Clemmons, N.C.; Ian L. Wilson, Murrysville, Pa.

[73] Assignee: Westinghouse Electric Corp., Pittsburgh, Pa.

[21] Appl. No.: 171,081

[22] Filed: Mar. 21, 1988

[51] Int. Cl.$^4$ .................................................. B21K 3/04
[52] U.S. Cl. .................................. 29/156.8 B; 29/557; 204/129.43; 219/69.11; 219/69.17
[58] Field of Search ................ 29/156.8 B, 90 A, 557; 72/53; 219/69 M, 69 C, 69 W

[56] References Cited

U.S. PATENT DOCUMENTS

| | | | |
|---|---|---|---|
| 2,442,193 | 6/1947 | Hague | 29/156.8 B |
| 2,581,252 | 1/1952 | Goetzel et al. | 29/156.8 B |
| 2,660,779 | 12/1953 | Atkinson | 29/156.8 B |
| 3,079,681 | 3/1963 | Fentimar | 29/156.8 H |
| 3,668,913 | 6/1972 | Morris . | |
| 4,188,522 | 2/1980 | Baker . | |
| 4,366,359 | 12/1982 | Yatomi et al. | 219/69 M |
| 4,426,867 | 1/1984 | Neal et al. | 72/53 |
| 4,428,213 | 1/1984 | Neal et al. | 72/53 |
| 4,454,740 | 6/1984 | Neal et al. . | |
| 4,559,434 | 12/1985 | Kinoshita | 219/69 M |
| 4,746,782 | 5/1988 | Weber | 219/69 M |

OTHER PUBLICATIONS

"Shot Peeniny Applications", Metal Movement Co. Inc, 6th Ed., 1980, U.S.A. pp. 30 & 35.
"Glass Bead Impact Blasting" by Michael Woelfel & Robert Mulhall, Metal Progress, vol. 122, #4, Sep. 1982

Primary Examiner—P. W. Echols
Assistant Examiner—Irene Cuda

[57] ABSTRACT

A method and apparatus for producing turbine blade roots (23) utilize an electro-discharge machining apparatus (10) to machine critical portions of the blade root (23) and a peening apparatus (25) for peening of the machined portions. The electro-discharge machining of the blade root leaves recast layers (22) on the surface of the blade root (23), and high residual tensile stresses are found in the surface of the blade root (23), which could lead to crack propagation. Peening of the machined surfaces leaves compressive residual stresses near the surface and reduces the recast layers (22). The resulting blade root (23) meets the same specifications for durability and tolerances as a blade root machined using the conventional transfer line type cutting process, but at a fraction of the cost.

8 Claims, 2 Drawing Sheets

METHOD AND APPARATUS FOR PRODUCING TURBINE BLADE ROOTS

BACKGROUND OF THE INVENTION

1. Field of the Invention

The present invention relates to a method and apparatus for producing turbine blade roots, and, more particularly, to a method for producing turbine blade roots by a combination of wire electric discharge machining and subsequent peening of the machined portions.

2. Description of the Related Art

As is well known, the manufacture of high precision turbine blades and the corresponding turbine blade roots is a highly exacting operation. Tolerances are particularly critical for both components at the point at which the turbine blades are fitted onto turbine rotors. There are a wide variety of designs of turbine blades and roots, but for all varieties, a major problem has always been the extreme stresses to which the blade roots are subjected during operation of the turbine. Therefore, during manufacture, turbine blade roots must be precision cut to conform with strict requirements for fit, while maintaining durability.

Conventionally, a turbine blade root has been formed by a transfer line type cutting process having multiple operations, including broaching. Such a process requires extensive set-up time for each operation; for broaching alone, the set-up time is fifteen hours. In addition, the tools required for each operation are very expensive. Moreover, as dedicated specialized tooling is required for each type of blade root to be manufactured, tooling time alone for each blade root design can require 16 to 30 weeks of lead time.

SUMMARY OF THE INVENTION

An object of the present invention is to provide a method for producing turbine blade roots which meet or exceed the rigid tolerance and durability requirements while reducing the total time required for production.

A further object of the present invention is to provide a method for producing turbine blade roots inexpensively relative to the prior art.

The above objects are attained by providing a method for producing turbine blade roots comprising the steps of: machining a blank turbine blade root into a desired blade root shape and peening the machined portions of the machined blade root to reduce the effects of surface recast layers and residual tensile stresses. The peening may be accomplished using 110 steel shot at a peening intensity of 4 Almen (A) to 6 A. Alternatively, glass beads may be used as the peening material. Data relative to a variety of blade roots may be input into the electro-discharge machining apparatus and stored, thereby allowing operator selection of the blade root type to be produced.

These objects, together with other objects and advantages will become readily apparent from the following description, reference being had to the accompanying drawings, wherein like reference numerals refer to like parts throughout.

DESCRIPTION OF THE PREFERRED EMBODIMENTS

Electro-discharge machining (EDM) and peening are both known processes. EDM is inexpensive compared to the costs involved with setting up a transfer line cutting process, and currently available EDM apparatuses are microprocessor controlled, allowing efficient operation with a minimum of supervision. However, the use of electro-discharge machined materials in high stress applications has always been problematic, in that residual tensile stresses develop and a recast layer forms on or near the surface of the machined areas of the material. In high-stress turbine applications these can lead to crack propagation, which could result in failure of a blade root to hold its turbine blade in place, and subsequent severe damage to the turbine and surrounding equipment. In nuclear reactors using stream turbines to generate electricity in particular, such a failure could be very expensive and possibly disastrous.

The inventors have found that these problems can be rectified by peening the machined surfaces. Peening does not significantly alter the dimensions of the machined areas, unlike other possible alternatives, such as grinding or chemical etching. Peening will reduce the recast area, and eliminate most regions of residual tensile stress, and desirably leaving in their place regions of residual compressive stress.

Figure 1:
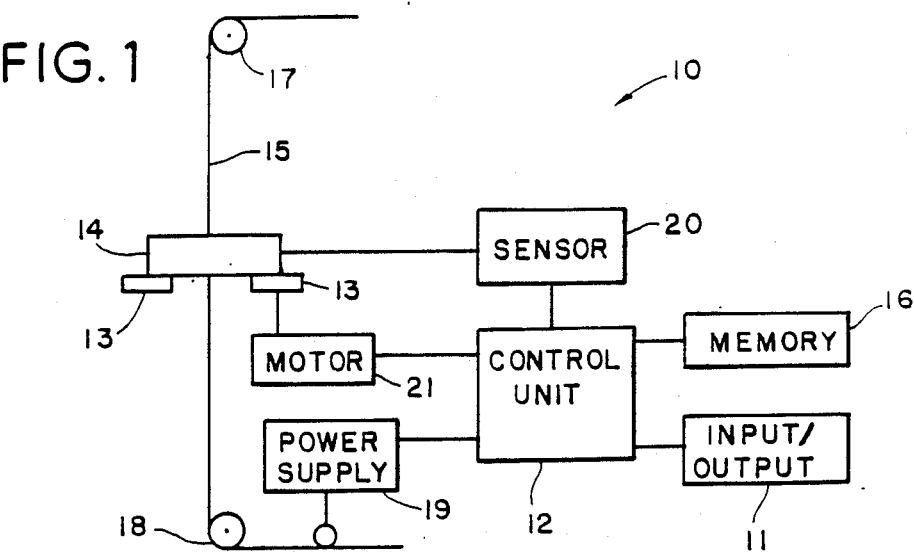
FIG. 1 is a schematic view of a wire electro-discharge machining apparatus.

Data pertaining to the desired shape for a finished blade root is input into an EDM apparatus 10 via an input/output device 11 into a control unit 12 as illustrated in FIG. 1. A suitable EDM apparatus is a Series R Wire EDM which can be obtained from Fanuc Ltd. of Japan. The control unit 12 converts the input data into instructions for moving a table 13 on which a blank blade root 14 is positioned relative to a stationary conductive cutting wire 15 for forming the desired shape. The instructions are stored in a memory 16 for use during the cutting operation. Instructions corresponding to a number of a different desired blade root shapes may be stored in the memory 16. The different instructions may be accessed by an operator for use as needed, thereby nearly eliminating startup time when changing blade root designs to be manufactured.

The conductive cutting wire 15 is held under tension between upper and lower wire guides 17 and 18. The wire 15 is continuously moved between the upper and lower guides 17 and 18. A power supply 19 produces a current in the wire 15. This current provides the cutting spark or discharge between the wire 15 and the blank blade root 14. A sensor 20 continuously senses gap voltage between the wire 15 and the blade root 14. The gap voltage is monitored by the control unit 12. The sensing of a change in the gap voltage indicates that the wire 15 and the blade root 14 need to be moved relative to each other to continue the cutting process. The control unit 12 causes a motor 21 to move the table 13 in the necessary X-Y direction so that the wire 15 continuously cuts the blank blade root 14 to form the desired shape.

Figure 2:
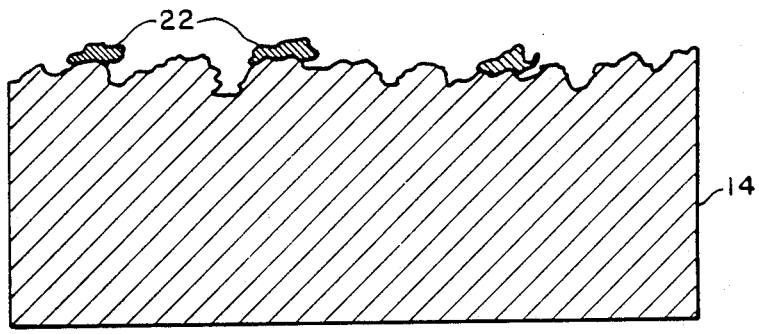
FIG. 2 is a highly magnified view illustrating the recast layer on a machined blade root surface using the wire electro-discharge machining apparatus of FIG. 1.

While electro-discharge machining eliminates the previously required multiple operations to obtain a precisely cut product, possible complications still exist. The cutting procedures must be controlled to minimize development of a recast layer 22 in the surface layer of the shaped blade root as illustrated in high magnification (approximately 1000x) in FIG. 2. A cutting speed of approximately 2.92 mm/min (0.115 in/min) and cutting current of 9 amps at 40 volts will minimize the recast layer 22 for a root made of the stainless steels used for turbine blade roots. The recast layer 22 develops on the surface of the machined blade root 14 due to the heat generated by the electro-discharge machining process. While controlling the cutting speed and the cutting current will keep the recast layer to a minimum, generally less than 0.127 mm (0.0005") and usually under 0.051 mm (0.0002"), as mentioned above, possible complications exist. For example, there is the possibility of crack propagation due to fatigue or stress corrosion, especially when the other primary problem, residual tensile stress, is also present. Residual tensile stresses are found near the surface after EDM. Tests show that at the surface of a blade root machined by EDM, the residual tensile stresses approach +70,000 pounds/square inch (+70 ksi). Profiles through the surface show a steep gradient in stress, with the stress level being below +20 ksi within 0.254 mm (0.001") of the surface. High tensile stress is a problem in itself as it may contribute to crack initiation during use.

As mentioned above, the inventors have discovered that peening of the electro-discharge machined surfaces of the blade root will result in the virtual replacement of residual tensile stresses by compressive stresses, and elimination of the brittle surface recast layer or reduction thereof beneath significant levels. These results virtually eliminate the possibility of crack propagation due to the EDM operation, while the required tolerances in the blade root are maintained.

Figure 3:
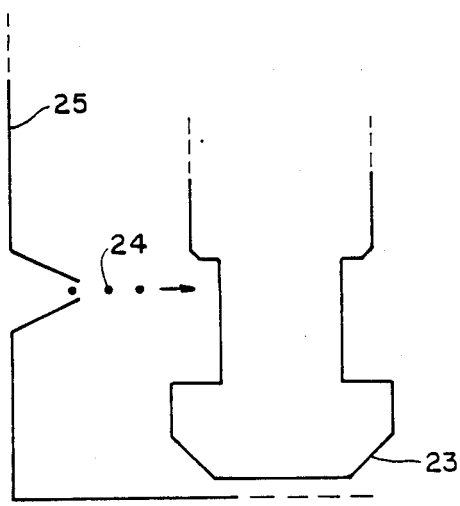
FIG. 3 is a perspective view of a shot peening apparatus peening a blade root.

A wide variety of peening apparatuses are available and a suitable machine can be obtained from the Empire Abrasive Equipment Corporation of Langhorne, Pennsylvania. For the present invention, it has been found that preferred parameters include the use of 110 steel shot and a peening intensity of 4 A to 6 A, a standard peening intensity. As schematically illustrated in FIG. 3, the machined areas of a TEE-blade root 23 are peened with shot 24 delivered by a peening device 25.

As all machined corners are curved, having at least the diameter of the shot to be used in peening, there should be no difficulty in peening all machined areas.

Figure 4:
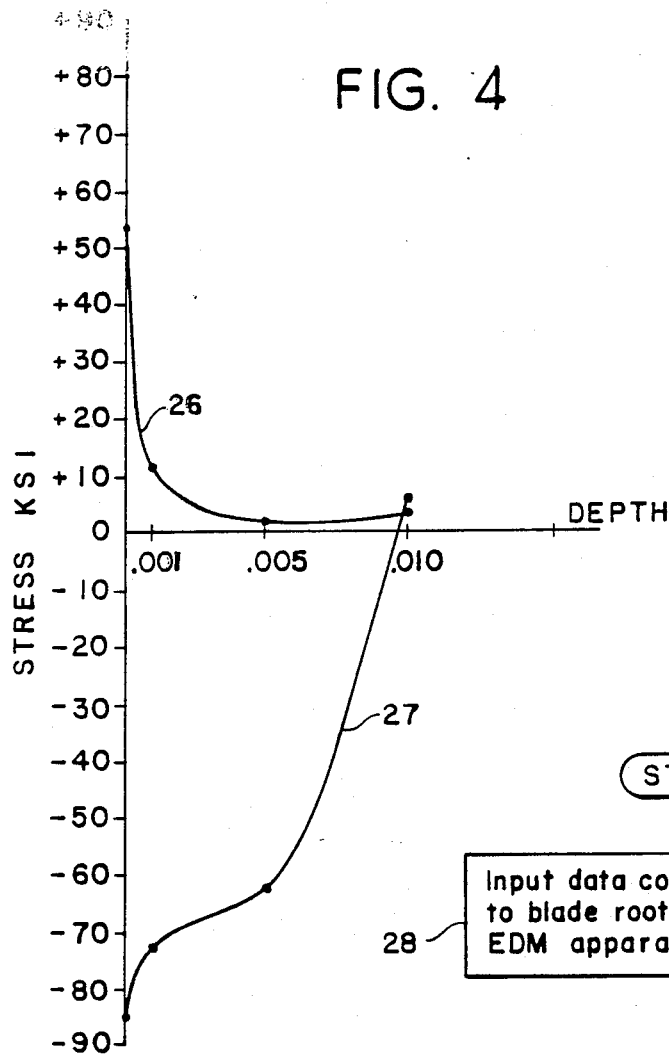
FIG. 4 is a graph illustrating residual stresses near the surface of a blade root that has undergone electro-discharge machining, before and after shot peening.

Curve 26 of FIG. 4 graphically represents the residual stresses (all tensile) at depths within the surface of a machined blade root before peening. In contrast, curve 27 represents the residual stresses near the surface of the machined blade root after peening. This graph is based on test data obtained from a sample blade root made from a 403 series stainless steel, which is commonly used for blade roots. It is quite clear that where tensile stresses (+stresses) had previously been prevalent, compressive stresses (−stresses) have replaced them. At the same time, recast surfaces on the surface are also reduced or eliminated by the peening. In this way, the possibility of crack propagation due to residual tensile stresses and recast surfaces is nearly eliminated.

Alternatively, instead of steel shot, glass beads may be used to peen the machined surfaces. While generally less powerful than steel shot, glass beads may be especially useful when higher tolerances are required.

Figure 5:
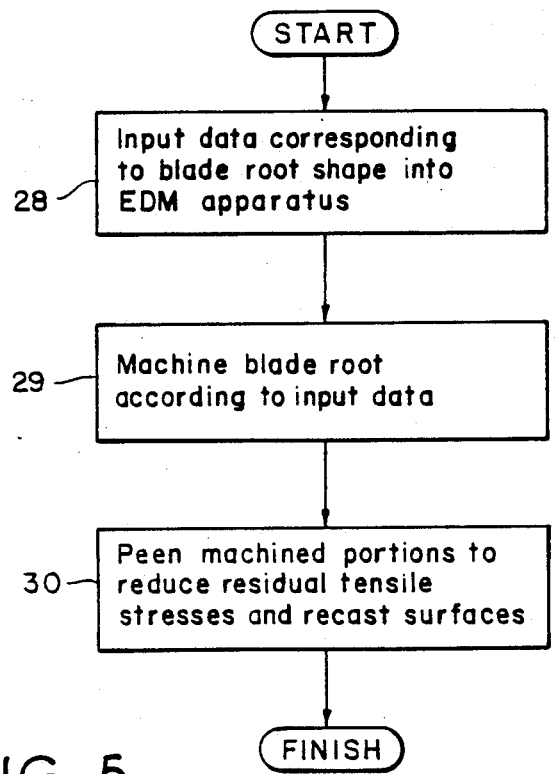
FIG. 5 is a block diagram of the present invention.

A general overview of the method for producing blade roots is provided by the flowchart in FIG. 5. In step 28, data corresponding to the desired blade root shape is input into an EDM apparatus. In step 29, a blank blade root is machined by the EDM apparatus to conform to the desired shape. In step 30, the machined regions of the blade root are peened to reduce the recast layer and the residual tensile stresses therein.

There are many advantages with such a process. The entire process can be performed in a single manufacturing cell, so that a minimal amount of space is needed for the process. Only a single operator is necessary to supervise the entire process. Further, the process is such that flexible manufacturing is possible. The entire process can be robot controlled corresponding to commands from a single tape in an overall control apparatus.

The many features and advantages of the present invention are apparent from the detailed specification and thus, it is intended by the appended claims to cover all such features and advantages of the method and apparatus which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to falling within the scope and spirit of the invention.

What is claimed is:

1. A method for producing turbine blade roots, comprising the steps of:
   (a) inputting data corresponding to a plurality of desired blade root shapes into an electro-discharge machining apparatus, storing the input data and selecting a desired blade root shape from the stored input data to be used to machine a blank turbine blade root;
   (b) electro-discharge machining the blank turbine blade root into the desired blade root shaped; and
   (c) peening the machined portion of the machined blade root at an intensity of from 4 almen to 6 almen to reduce surface recast and residual tensile stresses.

2. A method for producing turbine blade roots are recited in claim 1, wherein 110 steel shot is used for peening in step (c).

3. A method for producing turbine blade roots as recited in claim 1, wherein step (c) further comprises peening the machined portions with glass beads.

4. A method for producing turbine blades as recited in claim 1, wherein the machining in step (b) is done at a cutting speed of approximately 2.92 mm/min and a cutting current of 9 amps at 40 volts.

5. An apparatus for producing turbine blade roots comprising:
   means for electro-discharge machining a blank turbine blade root into a desired blade root shape and storing machining data;
   means for inputting data corresponding to a plurality of blade root shapes into said electro-discharge machining means;
   means for selecting the desired blade root shape from the stored input data to be used to machine the blank blade root; and means for peening machined portions of the machined blade root at an intensity of from 4 almen to 6 almen for reducing surface recast and residual tensile stresses.

6. An apparatus for producing turbine blade roots according to claim 5, wherein 110 steel shot is used as peening material by said means for peening.

7. An apparatus for producing turbine blade roots according to claim 5, wherein glass beads are used as peening material by said means for peening.

8. An apparatus for producing turbine blades according to claim 5, wherein said means for electro-discharge machining operates at a cutting speed of approximately 2.92 mm/min and a cutting current of 9 amps at 40 volts.

* * * * *